June 23, 1964     MASAO MATSUMOTO     3,138,017
APPARATUS FOR CORRECTING AN ERROR DUE TO AN INCREASE IN OIL
HEAD IN MATERIAL TESTING MACHINES OF OIL PRESSURE TYPE
Filed June 27, 1961            2 Sheets-Sheet 1

INVENTOR
MASAO MATSUMOTO
BY
Morgan, Finnegan, Durham & Pine
ATTORNEYS

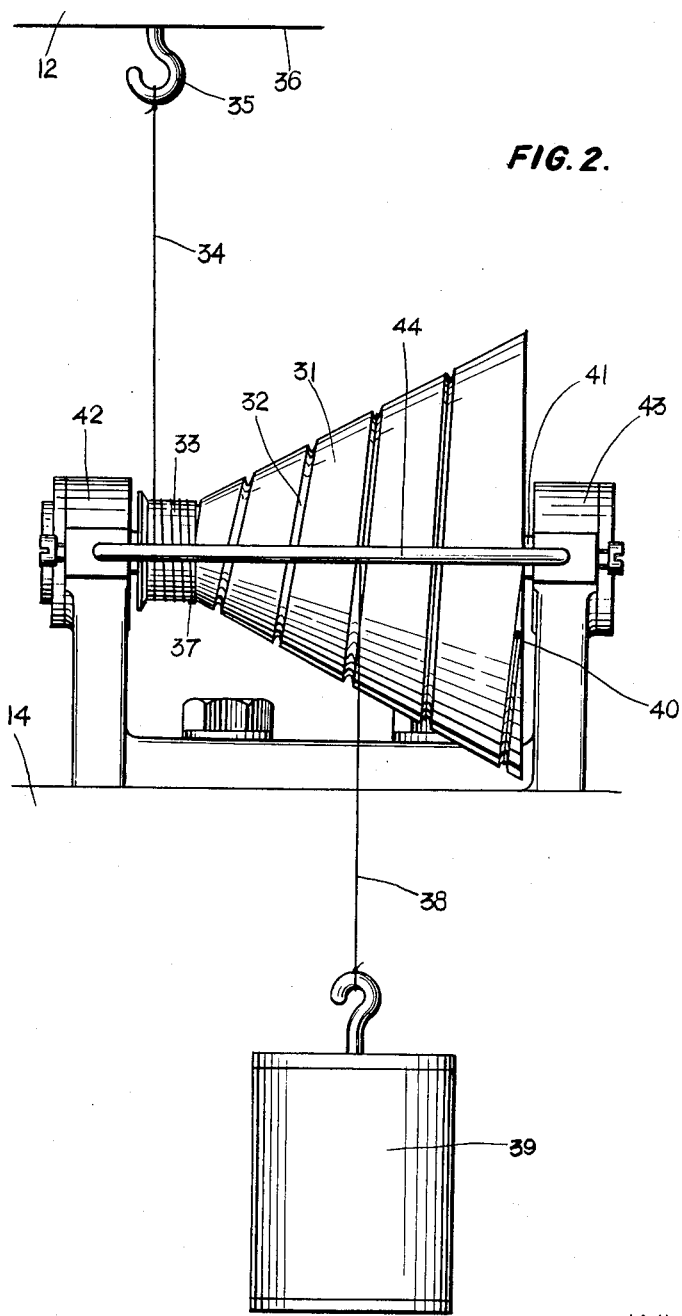

United States Patent Office 3,138,017
Patented June 23, 1964

3,138,017
APPARATUS FOR CORRECTING AN ERROR DUE TO AN INCREASE IN OIL HEAD IN MATERIAL TESTING MACHINES OF OIL PRESSURE TYPE
Masao Matsumoto, Kita-ku, Kyoto, Japan, assignor to Shimazu Seisakusho Co., Ltd., Nakagyo-ku, Kyoto, Japan
Filed June 27, 1961, Ser. No. 119,876
Claims priority, application Japan June 29, 1960
4 Claims. (Cl. 73—93)

This invention relates to tension and compression testing machine of hydraulic or oil pressure type and more particularly to apparatus for correcting an error in measurement and indication for use with tension and compression testing machines of hydraulic or oil pressure type.

The testing machine of oil pressure type generally comprises means for supporting a specimen, means for applying load by means of oil pressure to the specimen to deform it and means for measuring and indicating the load applied. The means for applying load to the specimen includes an oil cylinder which is vertically arranged, a ram movably fitted therein, the upper end of which is suitably secured to a movable cross head, and an oil pressure source from which pressure oil is supplied through a conduit to the cylinder by means of a pump. When oil is pumped into the cylinder, it presses and raises the ram, the motion of which is so transmitted to a movable cross head incorporated with the ram as to compress or tension the specimen between the movable cross head and a stationary cross head. The load applied to the specimen may be measured and indicated in terms of oil pressure in the cylinder with a pressure gauge suitably mounted on the machine. The head of oil in the cylinder changes according to an increase in the load applied because the ram is raised upwards by an increasing volume of oil in the cylinder. Thus, the oil pressure measured and indicated with a pressure gauge will necessarily involve an error due to the above increase in head of oil. Although this error may be overlooked in the ordinary testing machines because of its relatively small value, where a higher accuracy is required it is necessary to correct this error by some means.

It is, therefore, the primary object of the present invention to provide a new and useful apparatus for correcting an error due to any increase in oil head in material testing machines of oil pressure type, which is simple in construction and may be economically produced.

Another object of the invention is to provide an improved tension and compression testing machine in which a higher accuracy is attained in measurement and indication.

These and other objects will be apparent to those skilled in the art from the following description of some preferred embodiments of the invention as illustrated in the accompanying drawings wherein:

FIG. 2 shows a preferred embodiment of the present invention on an enlarged scale;

Figure 1:
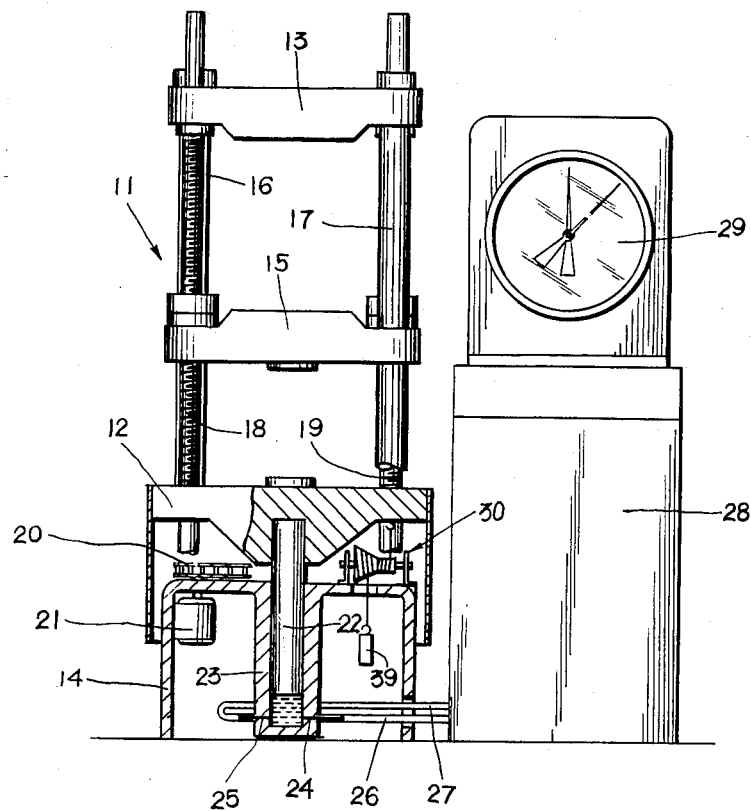
FIG. 1 is a schematic front view, partly broken and partly in section, of a tension and compression machine of oil pressure type which is provided with an apparatus embodying the present invention.

Referring now in detail to the drawings, there is schematically illustrated in FIG. 1 an oil pressure type of tension and compression testing machine which is provided with error correcting apparatus according to the invention. The testing machine illustrated in the drawing comprises means for supporting a specimen, means for applying load by means of oil pressure to the specimen to deform it and means for measuring and indicating the load applied. Means for supporting a specimen includes a double frame, generally indicated as 11, with a movable pair of cross heads 12, 13 and a stationary pair of cross heads 14, 15 arranged in horizontally parallel relationship to each other in such a manner that the lower cross head 12 of the movable pair may be positioned between the stationary pair of cross heads 14 and 15, and the upper cross head 15 of the stationary pair may be positioned between the movable pair of cross heads 12 and 13. The upper and lower movable cross heads 12, 13 are hereinafter referred to as the upper movable cross head and movable table, respectively, and the upper and lower stationary cross heads 15, 14 to as the intermediately positioned cross head and the bed, respectively.

The upper movable cross head 13 and the table 12 are connected by a pair of vertically extending columns 16 and 17 to form a fixed frame so that they are spaced in horizontally parallel relationship and at a constant distance therebetween. The connecting columns 16 and 17 pass slidably through the intermediately positioned, stationary cross head 15.

The intermediately positioned cross head 15 and the bed 14 are connected by another pair of vertically extending columns 18 and 19 to form an expansible frame. This pair of columns 18 and 19, which are externally threaded except their opposite end portions, are rotatably installed on the upper surface of the bed 14. Extending vertically upwards therefrom, they pass slidably at their unthreaded lower portions through the movable table 12, then thread through the intermediate stationary cross head 15 and further extend upwards until they arrive at and pass through the upper movable cross head 13. The upper end portions of the externally threaded columns 18 and 19 remain unthreaded so that the upper movable cross head 13 may slide along the length of them.

The externally threaded columns 18 and 19 which are rotatably installed as mentioned above, are provided near their lower ends and immediately above the upper surface of the bed 14 with the respective chain wheels (not shown) which are connected by means of an endless chain 20 which may be driven by a motor 21 suitably provided inside the bed 14. When the two columns 18 and 19 are simultaneously rotated by driving the endless chain 20, the intermediately positioned cross head 15 through which the columns 18 and 19 thread moves upward or downward. In this manner the cross head 15 may be settled at the desired height according to the length of the specimen to be tested, which is held between the intermediately positioned cross head 15 and the table 12 (in case of compression testing) or between the upper movable cross head 13 and the intermediately positioned cross head 15 (in case of tension testing).

The table 12 is incorporated with and actuated by a vertically extending ram 22, which in turn is slidably fitted into an oil cylinder with which the stationary bed 14 is provided at its central portion. The oil cylinder 23 has a pair of ports 24 and 25 at its bottom: one being connected through a conduit 26 to a suitable oil pressure source with an oil pump and the other being connected through a conduit 27 to a pressure gauge. Although there is shown in the drawing neither oil pressure source nor pressure gauge mechanism in more detail, it should be understood that they are provided inside a base casing 28 which is installed by the side of the abovementioned bed 14 and on the top of which a pressure indicator 29 is mounted.

When the ram 22 is raised upwards, together with the fixed frame which consists of the upper cross head 13, the table 12 and a pair of connecting columns 16, 17, by means of oil pressure in the cylinder 23 which is supplied from an oil pump, the specimen held between the intermediately positioned, stationary cross head 15 and the movable table 12 or the upper movable cross head 13 is subjected to compression or tension. The load applied to the specimen may be measured and indicated by a pressure gauge. The pressure gauge would not, however, indicate the correct load as applied to the specimen because an error necessarily occurs due to an increase of oil head in the oil cylinder 23. According to the present invention the error due to an increase in oil head in the cylinder can be automatically and advantageously corrected as described hereinafter.

The apparatus for correcting an error due to any increase in oil head comprises in combination means for applying a supplemental load to a movable cross head, which is actuated by means of oil pressure, and means for decreasing said supplemental load according to any increase in oil head which results in measurement and indication with an error.

Means for applying a supplemental load to a movable cross head may be embodied through the utilization of a wheel-and-axle mechanism, and means for decreasing said supplemental load according to any increase in oil head may be embodied by forming the wheel of said wheel-and-axle mechanism in such a shape that the radius of the wheel may vary in proportion to the rotatory angle.

A device embodying the invention is generally indicated as 30 in FIG. 1 and illustrated in more detail by way of example in FIG. 2. The device according to the invention includes a rotatable sheave 31 of a conical shape, the central axis of which is horizontally carried. The conical sheave 31 is provided at its periphery with a spiral groove 32 and incorporated with a cylindrical portion 33. A wheel-and-axle mechanism is, thus, formed of the conical sheave 31 as a wheel and the cylindrical portion 33 as an axle. The cylindrical portion 33 is connected to the movable table 12 by a string 34 in such a manner that one end of the string 34 is fixed to a hook 35 mounted on the lower surface 36 of the table 12 and the other end portion of the string 34 is coiled around the cylindrical portion 33, the string 34 being vertically stretched between the hook 35 and the cylindrical portion 33. The string 34 may be made of such a stiff material as a string for a kite or a steel wire. 37 is the other end of the string 34 fixed to a suitable point around the cylindrical portion 33. Another string 38 is coiled at its one end portion along the spiral groove 32 around the conical body and at its free end connected to a weight 39. The string 38 may be made of the same material as the string 34. 40 is the fixed end of the string 38 which is positioned near the external end of the spiral groove 32 of the conical body 31. The weight load due to the weight 39 gives the conical sheave 31 a rotatory moment whereby the string 34 is stretched under tension, any loose length of the string 34 being wound up around the cylindrical portion 33. 41 is the central shaft of the conical sheave 31 with a cylindrical portion 33; 42 and 43 are bracket bearings which carry rotatably the shaft 41 at its opposite ends and is secured to the bed 14; and 44 is a contact bar which is horizontally supported at a height of the axis of the cone 31 along its generating line in order to prevent the string 38 from slipping out of the groove 32.

When the table 12 incorporated with the ram 22 is moved upward by pumping pressure oil into the cylinder 33, the string 34 is pulled upward whereby the sheave 31 is rotated in such a direction that the string 38 may be wound up along the spiral groove 32. Then, the point from which the string 38 with the weight 39 starts to hang will move along the groove 32 leftward in the FIGURE 2 and approach toward the axis of the cone 31. In this manner the arm hanging the weight 39, namely the distance between the axis of conical sheave 31 and the point from which the string 38 with the weight 39 starts to fall down may be decreased with the result that the rotatory moment of the sheave 31 decreases accordingly. On the contrary, when the table is moved downward, any loose length of the string 34 is wound up around the cylindrical portion 33 because of reverse rotation of the conical sheave 31 which is driven by the weight load of the weight 39, the string 38 with the weight 39 being unwound from the spiral groove 32. In the case the load point moves in the direction toward the base of the conical sheave 31 (rightward in FIG. 2) with the result of an increase in the rotatory moment of the sheave 31 due to an increase in the effective length of the arm hanging the weight 39.

According to the invention the tensile load which is applied through the vertically stretched string 34 to the table 12 may vary according to the movement of the table, as described above. Correction of an error due to any increase in oil head can be carried out through the utilization of the above effect. The tensile force F which is applied through the string 34 to the table 12 is represented as follows:

$$F = \frac{WR}{r}$$

wherein W is the weight of the weight 39, R is the length of the arm hanging the weight 39 which corresponds to the length between the axis of the cone 31 and the point from which the string 38 with the weight 39 starts to fall downward apart from the spiral groove 32 and $r$ is the radius of the cylindrical portion 33. On the other hand an error E due to an increase in oil head may be represented by the following formula:

$$E = \rho A h$$

wherein $\rho$ is the specific gravity of the oil, A is the area of the cross section of the cylinder 23 and $h$ is an increase in oil head. The error E due to an increase in oil head may, therefore, be corrected, if $$E = F$$

namely, $$\rho A h = \frac{WR}{r}$$

$$R = \frac{r \rho A}{W} h = k h$$

wherein $k$ is a constant. That is to say, the length of the arm hanging the weight 39 should vary in proportion to any increase in oil head which is equal to a movement of the table 12. It will be obvious that the above condition may be satisfied with the use of the spiral groove 32 on the periphery of the cone 31.

Figure 3:
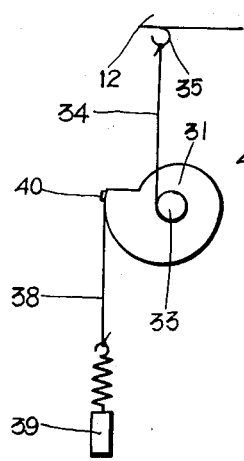
FIG. 3 is a front view of another embodiment of the present invention.
Figure 4:
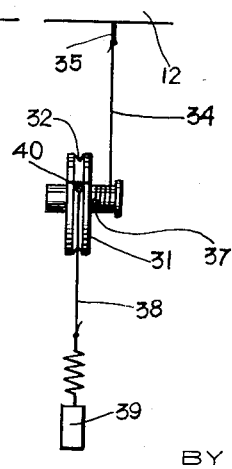
FIG. 4 is a side view of FIG. 3.

An involutely shaped sheave may be substituted for the above-mentioned conical sheave 31 with a spiral groove 32. FIGS. 3 and 4 show another embodiment of the invention in which an involutely shaped sheave 31 is illustrated. The same reference numerals in FIGS. 3 and 4 as those in FIG. 2 indicate the corresponding members having the same function as those illustrated in FIG. 2. It should be noted that the periphery of the sheave 31 illustrated in FIGS 3 and 4 is shaped in such an involute that the effective radius may vary in proportion to the rotatory angle.

What I claim is:

1. In a material testing machine of the oil pressure type, including a stationary cross head, a movable cross head, said two cross heads being arranged in a horizontally parallel relationship whereby a specimen may be held vertically therebetween, an oil cylinder, a ram movably fitted on same cylinder and connected to said movable cross head, means for supplying pressure oil from an oil pressure source to said oil cylinder, means connected to said cylinder for measuring and indicating the oil pressure load applied, means for applying a supplemental load to said movable cross head, and means for varying said supplemental load in direct response to any increase in oil head in said cylinder.

2. The invention as defined in claim 1 wherein said supplemental load applying means comprises a wheel-and-axle mechanism having a sheave and an axle, said sheave having a configuration whereby its effective radius varies in proportion to its rotatory angle, a string vertically stretched between said movable cross head and said axle, one end portion of said string being coiled around said axle, a weight, and another string one end of which is connected to said weight and the other end portion of which is coiled around said sheave.

3. The invention asd efined in claim 2 wherein said sheave is formed in the shape of a conical body with a spiral groove on its periphery and one end portion of said second-named string, having said weight at the other end, is coiled around said conical body along said spiral groove.

4. The invention as defined according to claim 3, wherein said sheave is formed in the shape of an involute whose effective radius varies in proportion to its rotatory angle.

References Cited in the file of this patent
UNITED STATES PATENTS

| | | |
|---|---|---|
| 2,176,722 | Sanner | Oct. 17, 1939 |
| 2,212,085 | Tate | Aug. 20, 1940 |